(12) United States Patent
Ishioka (10) Patent No.: US 10,594,375 B2
(45) Date of Patent: Mar. 17, 2020

(54) WIRELESS BASE STATION APPARATUS AND WIRELESS COMMUNICATION METHOD

(71) Applicant: MITSUBISHI ELECTRIC CORPORATION, Tokyo (JP)

(72) Inventor: Kazuaki Ishioka, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/305,010

(22) PCT Filed: Jun. 28, 2016

(86) PCT No.: PCT/JP2016/069164
§ 371 (c)(1),
(2) Date: Nov. 27, 2018

(87) PCT Pub. No.: WO2018/003022
PCT Pub. Date: Jan. 4, 2018

(65) Prior Publication Data
US 2019/0165842 A1    May 30, 2019

(51) Int. Cl.
*H01Q 1/24* (2006.01)
*H04B 7/0491* (2017.01)
(Continued)

(52) U.S. Cl.
CPC ......... *H04B 7/0491* (2013.01); *H04B 7/0456* (2013.01); *H04B 7/0617* (2013.01); *H04W 16/28* (2013.01); *H01Q 1/243* (2013.01)

(58) Field of Classification Search
USPC ......................................... 375/262; 348/143
See application file for complete search history.

(56) References Cited

U.S. PATENT DOCUMENTS 6,212,407 B1    4/2001   Hiramatsu
7,664,533 B2    2/2010   Logothetis et al.
(Continued)

FOREIGN PATENT DOCUMENTS

JP     10-190618 A    7/1998
JP     10-200322 A    7/1998
(Continued)

OTHER PUBLICATIONS

Extended European Search Report issued in corresponding Euroepan Application No. 16907255.0 dated May 31, 2019.
(Continued)

*Primary Examiner* — Eva Y Puente
(74) *Attorney, Agent, or Firm* — Birch, Stewart, Kolasch & Birch, LLP (57) ABSTRACT

A wireless base station apparatus that communicates with a plurality of terminals via spatial multiplexing includes: an active array antenna to transmit a first transmit signal; sector antennas to transmit second transmit signals; and a digital signal processor that generates the first transmit signal that is transmitted from the active array antenna and generates the second transmit signals that are transmitted from the sector antennas, the second transmit signals being transmit signals for eliminating interference between the terminals generated by the first transmit signal.

9 Claims, 10 Drawing Sheets

(51) Int. Cl.
*H04W 16/28* (2009.01)
*H04B 7/0456* (2017.01)
*H04B 7/06* (2006.01)

(56) References Cited

U.S. PATENT DOCUMENTS

| | | | |
|---|---|---|---|
| 2012/0258754 A1* | 10/2012 | Banu | H04W 8/186 |
| | | | 455/513 |
| 2013/0057432 A1 | 3/2013 | Rajagopal et al. | |
| 2013/0121185 A1 | 5/2013 | Li et al. | |
| 2016/0125713 A1* | 5/2016 | Blech | G08B 13/187 |
| | | | 348/143 |
| 2016/0127023 A1* | 5/2016 | Athley | H01Q 3/26 |
| | | | 375/267 |
| 2016/0345216 A1 | 11/2016 | Kishiyama et al. | |
| 2017/0012346 A1* | 1/2017 | Athley | H04B 7/10 |
| 2018/0026683 A1* | 1/2018 | Manholm | H04B 7/0452 |
| | | | 375/267 |

FOREIGN PATENT DOCUMENTS

| | | |
|---|---|---|
| JP | 2007-511165 A | 4/2007 |
| JP | 2010-10989 A | 1/2010 |
| JP | 2015-109692 A | 6/2015 |
| JP | 2015-164281 A | 9/2015 |
| WO | WO 2005/046080 A1 | 5/2005 |

OTHER PUBLICATIONS

International Search Report for PCT/JP2016/069164 (PCT/ISA/210) dated Sep. 13, 2016.
Japan Notification of Reason for Refusal of JP Patent Application No. 2016-573626 dated Apr. 18, 2017.

* cited by examiner

WIRELESS BASE STATION APPARATUS AND WIRELESS COMMUNICATION METHOD

FIELD

The present invention relates to a wireless base station apparatus including a plurality of antennas and to a wireless communication method.

BACKGROUND

Frequency resources used for wireless communication are scarce due to the proliferation of mobile phones. A technique for increasing the frequency utilization efficiency includes a Multiple Input Multiple Output (MIMO) transmission system put to practical use in Long Term Evolution (LTE) or the like. In order to further increase the frequency utilization efficiency, massive MIMO with a significantly larger number of transmitting/receiving antennas than the MIMO transmission system has been attracting attention in recent years (Patent Literature 1).

The massive MIMO performs beamforming with a two-dimensional active array antenna using several tens or more antenna elements, thereby achieving multi-user MIMO that allows for communication with users in different directions at the same time by directing beams toward the users, or terminals. The multi-user MIMO can expand the capacity by a base station directing beams toward a plurality of terminals and communicating with the plurality of terminals at the same time. The multi-user MIMO can also increase the propagation distance by narrowing the beam width and concentrating power.

CITATION LIST

Patent Literature

Patent Literature 1: Japanese Patent Application Laid-open No. 2010-10989

SUMMARY

Technical Problem

However, according to the above conventional technique, the spatial separation among the terminals achieved by the two-dimensional active array antenna is imperfect due to the influence of side lobes of the transmitted beam, channel multipath, or the like. This causes interference among the terminals, which results in failure to obtain an expected transmission rate. The aperture of the antenna needs to be increased in order to improve the spatial separation performance. The two-dimensional active array antenna, which places the antenna elements at narrow intervals, requires many antenna elements in order to increase the aperture, but cannot achieve the spatial separation performance commensurate with cost.

The present invention has been made in view of the above, and an object of the invention is to obtain a wireless base station apparatus that can eliminate interference between terminals.

Solution to Problem

In order to solve the above problem and achieve the object, the present invention provides a wireless base station apparatus that communicates with a plurality of terminals via spatial multiplexing. The wireless base station apparatus includes a digital signal processor that generates a first transmit signal that is to be transmitted from a two-dimensional array antenna, and generates a second transmit signal that is a transmit signal for eliminating interference between terminals generated by the first transmit signal, the second transmit signal being transmitted from a sector antenna. The wireless base station apparatus further includes the two-dimensional array antenna that transmits the first transmit signal and the sector antenna that transmits the second transmit signal.

Advantageous Effects of Invention

The wireless base station apparatus according to the present invention can eliminate the interference between the terminals.

DESCRIPTION OF EMBODIMENTS

A wireless base station apparatus and a wireless communication method according to an embodiment of the present invention will now be described in detail with reference to the drawings. Note that the present invention is not limited to the embodiment.

First Embodiment

Figure 1:
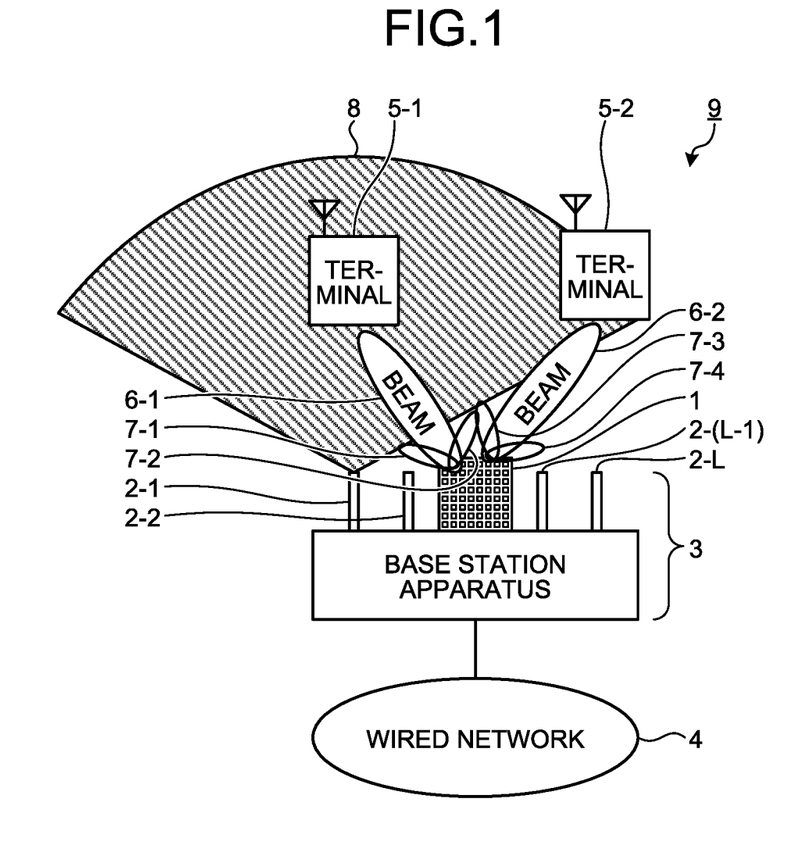
FIG. 1 is a diagram illustrating an example of the configuration of a wireless communication system according to a first embodiment.

FIG. 1 is a diagram illustrating an example of the configuration of a wireless communication system 9 according to a first embodiment of the present invention. The wireless communication system 9 includes a base station apparatus 3 which is a wireless base station apparatus, a wired network 4, and terminals 5-1 and 5-2 which are mobile wireless terminals. The base station apparatus 3 includes an active array antenna 1 and sector antennas 2-1 to 2-L. The base station apparatus 3 communicates with the terminals 5-1 and 5-2 via spatial multiplexing. The reference character "L" is an integer of 1 or more. Note that when L=1, only the sector antenna 2-1 may be used.

Upon acquiring data to be transmitted to the terminal 5-1 from the wired network 4, the base station apparatus 3 controls the active array antenna 1 to direct a beam 6-1 toward the terminal 5-1 and transmits the data to the terminal 5-1. The base station apparatus 3 also controls the active array antenna 1 to direct the beam 6-1 toward the terminal 5-1, and, when receiving data from the terminal 5-1, transmits the received data to the wired network 4. When the base station apparatus 3 directs the beam 6-1 toward the terminal 5-1, side lobes 7-1 and 7-2 are generated together with the beam 6-1 which is a main beam.

Upon acquiring data to be transmitted to the terminal 5-2 from the wired network 4, the base station apparatus 3 controls the active array antenna 1 to direct a beam 6-2 toward the terminal 5-2 and transmits the data to the terminal 5-2. The base station apparatus 3 also controls the active array antenna 1 to direct the beam 6-2 toward the terminal 5-2, and, when receiving data from the terminal 5-2, transmits the received data to the wired network 4. When the base station apparatus 3 directs the beam 6-2 toward the terminal 5-2, side lobes 7-3 and 7-4 are generated together with the beam 6-2 which is a main beam.

The base station apparatus 3 uses the sector antennas 2-1 to 2-L when transmitting common control data to the terminals 5-1 and 5-2 and when receiving random access data from the terminals 5-1 and 5-2. Although FIG. 1 illustrates a communication area 8 of the sector antenna 2-1, each of the other sector antennas 2-2 to 2-L also has a communication area of a similar size.

In the following description, the sector antennas 2-1 to 2-L may be referred to as a sector antenna 2 when the antennas are not distinguished from one another. The terminals 5-1 and 5-2 may be referred to as a terminal 5 when the terminals are not distinguished from each other. The beams 6-1 and 6-2 may be referred to as a beam 6 when the beams are not distinguished from each other. The side lobes 7-1 to 7-4 may be referred to as a side lobe 7 when the side lobes are not distinguished from one another. The active array antenna 1 and the sector antennas 2-1 to 2-L may be collectively referred to as an antenna.

Figure 2:
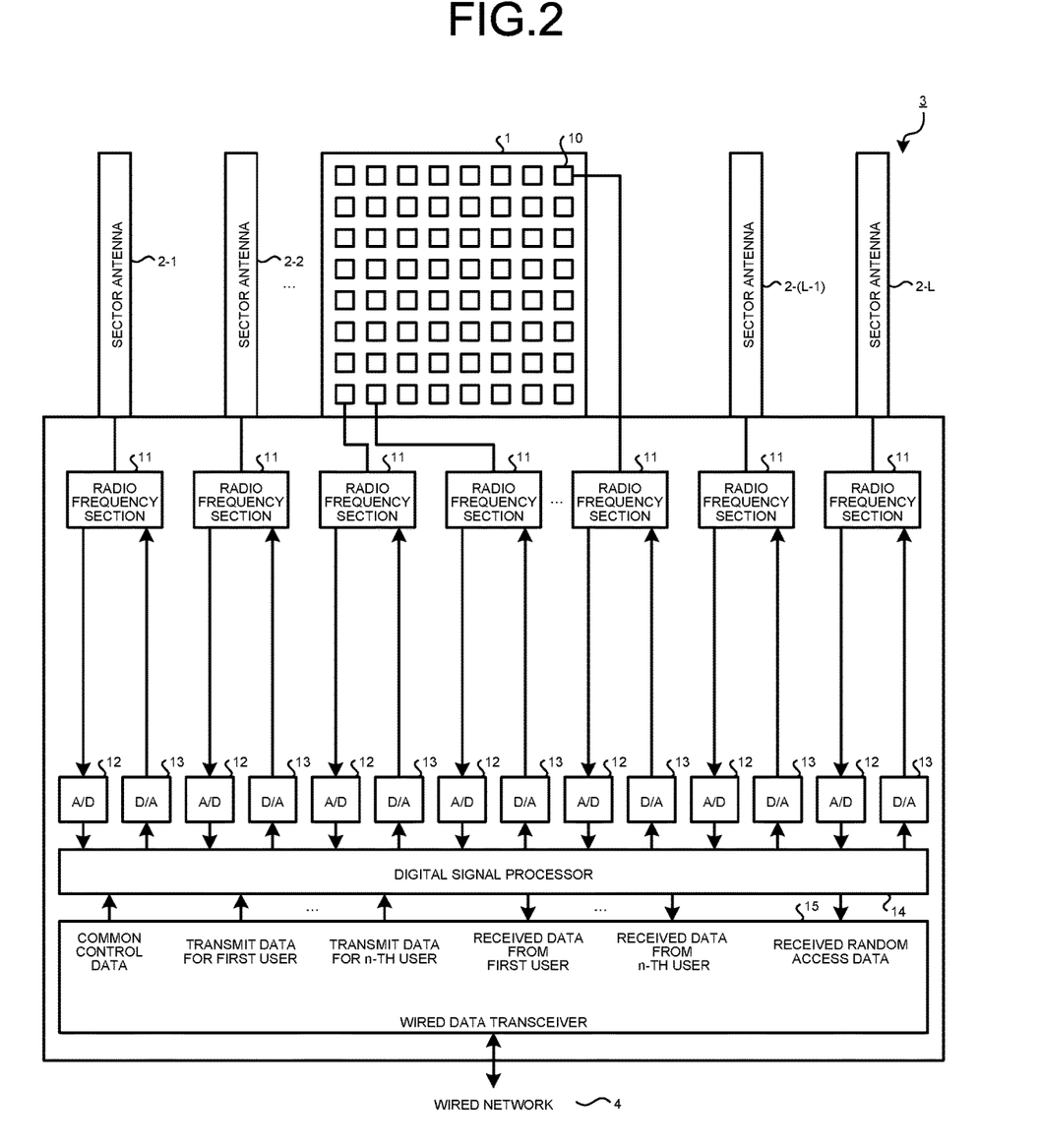
FIG. 2 is a block diagram illustrating an example of the configuration of a base station apparatus according to the first embodiment.

The configuration of the base station apparatus 3 will be described. FIG. 2 is a block diagram illustrating an example of the configuration of the base station apparatus 3 according to the first embodiment. The base station apparatus 3 includes the active array antenna 1, the sector antennas 2-1 to 2-L, a plurality of radio frequency sections 11, a plurality of analog-to-digital (A/D) converters 12, a plurality of digital-to-analog (D/A) converters 13, a digital signal processor 14, and a wired data transceiver 15. The base station apparatus 3 includes the radio frequency section 11, the A/D converter 12, and the D/A converter 13 for each antenna element 10 of the active array antenna 1 and each sector antenna 2.

The active array antenna 1 is, for example, a two-dimensional array antenna including a plurality of the antenna elements 10 that is two-dimensionally arranged every half wavelength. The active array antenna 1 can change the beam direction by changing the phase and amplitude of a signal for each antenna element 10. The beam width of the beam 6 generated by the active array antenna 1 equals a horizontal half-power angle of 20° and a vertical half-power angle of 20°, for example.

The sector antenna 2 is an antenna having a fixed beam pattern wider than the beam pattern of the active array antenna 1 in the horizontal direction, or equivalent to or wider than the beam pattern of the active array antenna in the vertical direction. The beam width of the beam generated by the sector antenna 2 equals a horizontal half-power angle of 100° and a vertical half-power angle of 20°, for example. The vertical beam direction of the sector antenna 2 is typically fixed to the direction of a cell edge. However, as with a conventional sector antenna, the sector antenna 2 has a tilt angle adjustable in accordance with a change in the cell radius due to measures against the blind zone or due to addition of the base station apparatus 3.

Figure 3:
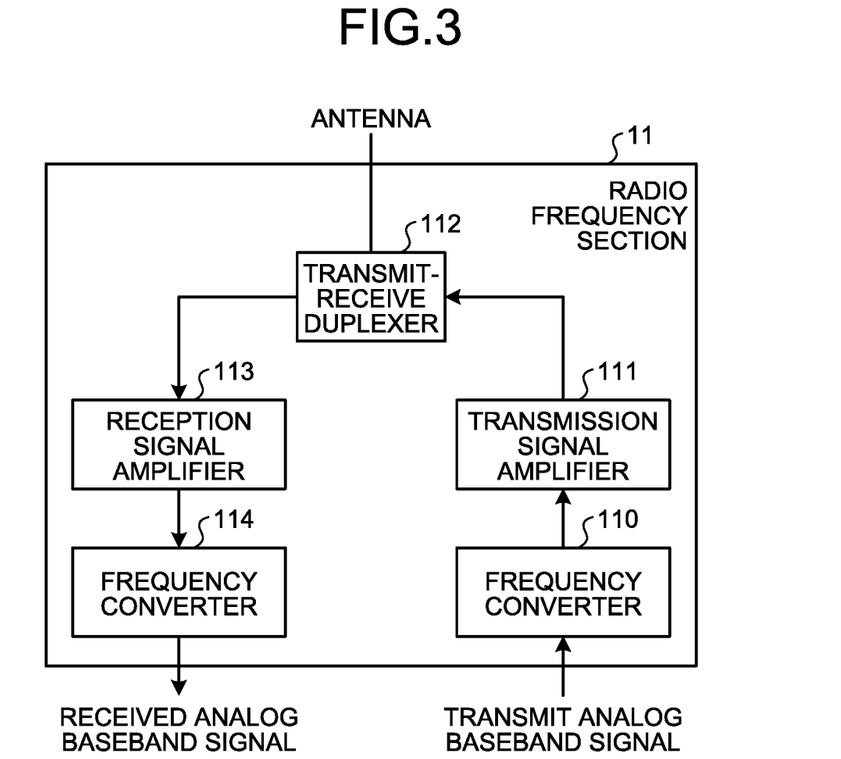
FIG. 3 is a block diagram illustrating an example of the configuration of a radio frequency section of the base station apparatus according to the first embodiment.

The base station apparatus 3 includes the radio frequency section 11 for each antenna element 10 of the active array antenna 1 and each sector antenna 2. FIG. 3 is a block diagram illustrating an example of the configuration of the radio frequency section 11 of the base station apparatus 3 according to the first embodiment. The radio frequency section 11 includes a frequency converter 110, a transmission signal amplifier 111, a transmit-receive duplexer 112, a reception signal amplifier 113, and a frequency converter 114.

When the base station apparatus 3 is to transmit data to the terminal 5, the frequency converter 110 converts the frequency of an analog baseband signal acquired from the D/A converter 13 into the radio frequency, the transmission signal amplifier 111 amplifies the signal to have desired transmit power, and the transmit-receive duplexer 112 outputs a transmit signal to the antenna connected thereto.

When the base station apparatus 3 is to receive data from the terminal 5, the reception signal amplifier 113 acquires a received signal from the connected antenna via the transmit-receive duplexer 112 and amplifies the received signal, and the frequency converter 114 converts the frequency of the received signal into the frequency of an analog baseband signal and outputs the signal to the A/D converter 12.

In the radio frequency section 11, the frequency converters 110 and 114 each include a frequency mixer, a local oscillator, and a filter. A semiconductor amplifier is used for each of the transmission signal amplifier 111 and the reception signal amplifier 113. Moreover, the transmit-receive duplexer 112 uses a semiconductor switch in the case of Time Division Duplex (TDD) or a frequency duplexer in the case of Frequency Division Duplex (FDD).

The A/D converter 12 is an analog-to-digital converter that receives the signal from the terminal 5, i.e., acquires the analog baseband signal from the radio frequency section 11 and convers the acquired analog baseband signal into a digital signal, such that the A/D converter 12 outputs the digital baseband signal to the digital signal processor 14.

The D/A converter 13 is a digital-to-analog converter that acquires, from the digital signal processor 14, a digital baseband signal, and converts the acquired digital baseband signal into an analog signal that is to be transmitted to the terminal 5, such that the D/A converter 13 transmits the analog baseband signal to the radio frequency section 11.

In transmitting data, the digital signal processor 14 generates the digital baseband signal for each antenna element 10 of the active array antenna 1 and each sector antenna 2, from the common control data and transmit data for each of a first user to an n-th user, and outputs the generated digital baseband signal to the D/A converter 13. In receiving data, the digital signal processor 14 acquires the digital baseband signal from the A/D converter 12 and separates the signal into received data for each of the first user to the n-th user and received random access data, which are in turn output to the wired data transceiver 15. The digital signal processor 14 uses the sector antenna 2 for transmitting a control signal common to the plurality of terminals 5 and for receiving random access signals from the plurality of terminals 5, and uses the active array antenna 1 and sector antenna 2 for transmitting and receiving a signal to/from each of the terminals 5.

The wired data transceiver 15 acquires, from the wired network 4, data that is to be transmitted to the terminal 5, and outputs the acquired data to the digital signal processor 14. The wired data transceiver 15 also outputs data received from the terminal 5, to the wired network 4.

Figure 4:
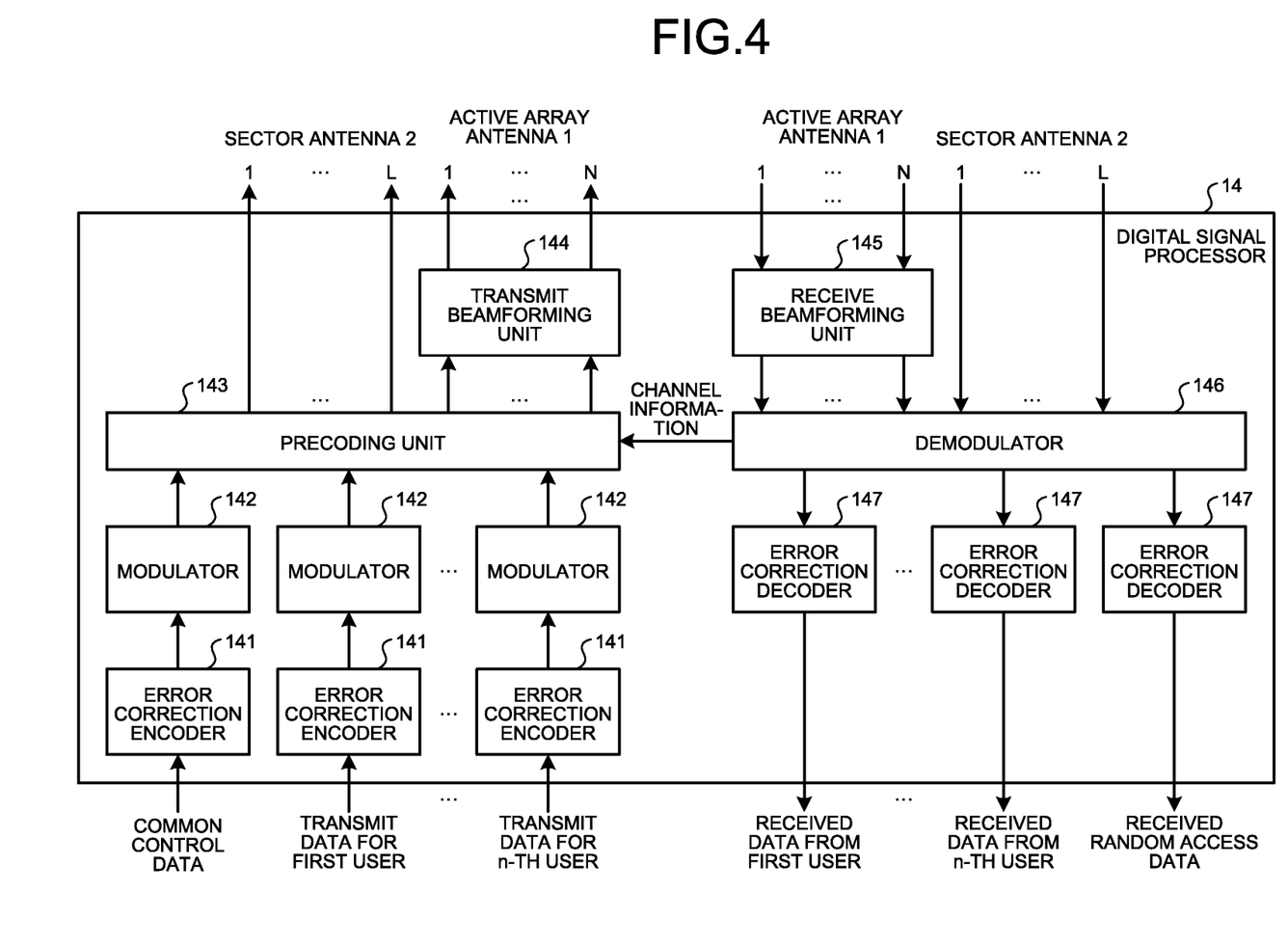
FIG. 4 is a block diagram illustrating an example of the configuration of a digital signal processor of the base station apparatus according to the first embodiment.

Next, the configuration of the digital signal processor 14 of the base station apparatus 3 will be described in detail. FIG. 4 is a block diagram illustrating an example of the configuration of the digital signal processor 14 of the base station apparatus 3 according to the first embodiment. The digital signal processor 14 includes a plurality of error correction encoders 141, a plurality of modulators 142, a precoding unit 143, a transmit beamforming unit 144, a receive beamforming unit 145, a demodulator 146, and a plurality of error correction decoders 147. The digital signal processor 14 includes the error correction encoder 141 and the modulator 142 for the common control data that is to be transmitted from the base station apparatus 3. The digital signal processor 14 includes the error correction encoder 141 and the modulator 142 for the transmit data for each user that is to be transmitted from the base station apparatus 3. Moreover, the digital signal processor 14 includes the error correction decoder 147 for the received random access data that is received by the base station apparatus 3. The digital signal processor 14 includes the error correction decoder 147 for the received data for each user that is received by the base station apparatus 3.

First, processing performed by the digital signal processor 14 when the base station apparatus 3 transmits data to the terminal 5 will be described. The plurality of error correction encoders 141 acquires, from the wired data transceiver 15, the common control data and the transmit data for each of the users, and each of the error correction encoders 141 performs error correction encoding such as turbo coding or Low Density Parity Check (LDPC) coding on corresponding one of the acquired common control data and the acquired transmit data.

Each of the plurality of modulators 142 acquires, from the corresponding error correction encoders 141, the data having been subjected to error correction encoding, and performs primary modulation such as Binary Phase Shift Keying (BPSK), Quadrature Phase Shift Keying (QPSK), 16 Quadrature Amplitude Modulation (QAM), or 64 QAM on the acquired data. The modulators 142 further perform secondary modulation such as Orthogonal Frequency Division Multiplexing (OFDM) on the data, and output such modulated data to the precoding unit 143.

The precoding unit 143 outputs a transmit signal indicative of the common control data to the sector antenna 2 via the D/A converter 13 and the radio frequency section 11. The precoding unit 143 also outputs a transmit signal indicative of the transmit data for each user to the transmit beamforming unit 144. As for the transmit signal indicative of the transmit data for each user, the base station apparatus 3 transmits, from the sector antenna 2, a signal for eliminating or canceling the interference between the terminals 5, the interference being generated by the signal transmitted from the active array antenna 1. As a result, the terminals 5 in the wireless communication system 9 eliminate the interference therebetween so that the base station apparatus 3 can perform high-speed transmission. Here, the precoding unit 143, which requires channel information on the channel between each antenna of the base station apparatus 3 and the antenna of the corresponding terminal 5, can use channel information extracted by the demodulator 146, for example. When the terminal 5 obtains channel information by its own demodulator and transmits the obtained channel information as data to the base station apparatus 3, the precoding unit 143 may use the channel information acquired from the terminal 5.

The transmit beamforming unit 144 multiplies the transmit signal indicative of the transmit data for each user, by a complex weighting factor for each antenna element 10 of the active array antenna 1, the factor being determined by the direction to each user, that is, to each terminal 5, such that the transmit beamforming unit 144 outputs the transmit signals added to each other on a terminal-by-terminal basis, namely, the transmit beamforming unit 144 outputs a beamformed transmit signal.

Next, processing performed by the digital signal processor 14 when the base station apparatus 3 receives data from the terminal 5 will be described. The receive beamforming unit 145 acquires a signal received by each antenna element 10 of the active array antenna 1 via the radio frequency section 11 and the A/D converter 12. The receive beamforming unit 145 multiplies the received signal for each antenna element 10 of the active array antenna 1, by a complex weighting factor for each antenna element 10, the factor being determined by the direction to each user, that is, to each terminal 5, such that a received signal from each direction of the terminal 5 is output from the receive beamforming unit 145 to the demodulator 146.

The demodulator 146 acquires the signal received by each sector antenna 2 and acquires, from the receive beamforming unit 145, the received signal from each direction of the terminal 5, and then separates, from these received signals, the received random access data and the received data for each user, such that the demodulator 146 demodulates these data. The demodulation processing performed by the demodulator 146 is similar to that by a conventional MIMO receiver. The demodulator 146 demodulates the data having been subjected to the secondary modulation such as OFDM and acquires the channel information from a pilot signal or the like included in the received signal. The demodulator 146 generates a reception matrix based on a zero forcing or Minimum Mean Square Error (MMSE) criterion and separates the signal by multiplying the reception matrix by the received signal. The demodulator 146 further demodulates the data having been subjected to the primary modulation such as BPSK, QPSK, 16 QAM, or 64 QAM.

The plurality of error correction decoders 147 each performs decoding processing such as turbo coding or LDPC coding on corresponding one of the received random access data and the received data for each user that are acquired from the demodulator 146.

Figure 5:
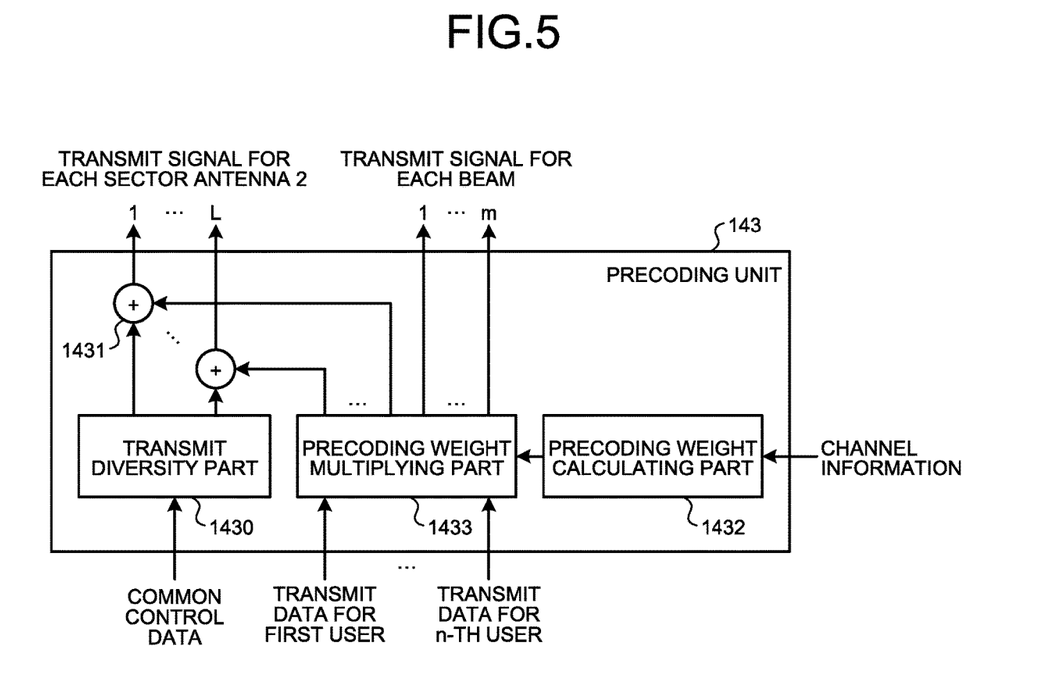
FIG. 5 is a block diagram illustrating an example of the configuration of a precoding unit of the digital signal processor of the base station apparatus according to the first embodiment.

FIG. 5 is a block diagram illustrating an example of the configuration of the precoding unit 143 of the digital signal processor 14 of the base station apparatus 3 according to the first embodiment. Since the common control data is transmitted from the "L" sector antennas 2, a transmit diversity part 1430 of the precoding unit 143 performs transmit diversity coding on the data. The transmit diversity coding scheme used by the transmit diversity part 1430 includes block coding such as Space Time Block Coding (STBC) or Space Frequency Block Coding (SFBC) standardized by 3rd Generation Partnership Project (3GPP) which is a standardization body, for example.

The precoding unit 143 performs precoding on the transmit data for each user such that no interference between the terminals 5 occurs when the transmit data is transmitted using both the active array antenna 1 and the sector antenna 2. In the precoding unit 143, an adder 1431 adds the common control data to the "precoded" transmit data for each user that has been subjected to the precoding, and outputs the data resulting from this addition, to the sector antenna 2. In precoding, a precoding weight calculating part 1432 calculates a precoding matrix on the basis of the channel information acquired from the demodulator 146. A precoding weight multiplying part 1433 multiplies the transmit data by the precoding matrix.

The channel information is represented by a matrix H, and letting "Rx" be a column vector in which the received signals for the antennas on "n" terminals 5 are arranged and "Tx" be a column vector in which the transmit signals for "L" sector antennas 2 and a column vector of "m" inputs to the transmit beamforming unit 144 are arranged in order, the column vector is expressed as Rx=HTx. The matrix H is a matrix with (L+m) rows and "n" columns. When the precoding weight is represented by a matrix W, the precoding weight calculating part 1432 performs the calculation indicated by below expression (1), for example.

$$W = HH(HHH)^{-1} \quad (1)$$

In expression (1), "$H^H$" represents a conjugate transpose of the matrix H. Expression (1) being a generalized inverse matrix of the matrix H and the following expression (2) holding true, the interference between the terminals 5 can be eliminated.

$$HW = I \quad (2)$$

In expression (2), "I" represents an identity matrix.

In the case of the plurality of antennas included, that is, a redundant antenna configuration, the precoding weight is calculated on the basis of the least squares method. The least squares method allocates higher power to a path with less loss, so that the active array antenna 1 performs main signal transmission using the beam in the direction of the terminal 5, while the sector antenna 2 is used for eliminating the interference. The precoding weight multiplying part 1433 multiplies the matrix W calculated by the precoding weight calculating part 1432, by a column vector A in which the transmit signals for the users are arranged. An output vector B of the precoding weight multiplying part 1433 is expressed by expression (3) below.

$$B = WA \quad (3)$$

Letting "C" be a column vector in which the transmit signals for "m" beams are arranged, "N" be the number of the antenna elements of the active array antenna 1, and "D" be a column vector in which the transmit signals from the antenna elements 10 of the active array antenna 1 are arranged, the transmit beamforming unit 144 uses a beamforming matrix E of "m" rows and "N" columns to perform multiplication indicated by expression (4) below. Each of "m" and "N" is an integer of one or more.

$$D = EC \quad (4)$$

In expression (4), a j-th row vector of the matrix E is the beamforming weight of a j-th beam, and letting "$v_j$" be a direction vector of the j-th beam and "$p_k$" be a position vector of a k-th element, an element $E_{j,k}$ in the j-th row and k-th column of the matrix E is expressed by expression (5) below.

[Formula 1]

$$E_{j,k} = e^{-i2\pi \frac{v_j \cdot p_k}{\lambda}} \quad (5)$$

In expression (5), "e" represents the base of the natural logarithm, "i" represents the imaginary unit, "λ" represents the wavelength of the radio frequency, and |$v_j$|=1. Moreover, "$v_j \cdot p_k$" represents a dot product of the vectors.

The receive beamforming unit 145 has the same beam direction as the transmit beamforming unit 144 and uses a conjugate transpose matrix of the matrix E as the beamforming matrix.

The demodulator 146 receives input of a column vector R with L+m elements in which the "L" received signals acquired from the sector antennas 2 and the "m" received signals acquired from the receive beamforming unit 145 are arranged, and outputs a column vector S in which n+1 received signals including the received signals from "n" users and the received random access signal are arranged. The demodulator 146 performs demodulation using below expression (6) corresponding to a least mean square error estimate, for example, on the basis of a channel matrix h with (L+m) rows and (n+1) columns obtained from the pilot signal included in the received signals.

$$S = (hHh + \sigma 2I) - 1h^H R \quad (6)$$

In expression (6), "$\sigma^2$" represents received noise power, and "I" represents the identity matrix.

Figure 6:
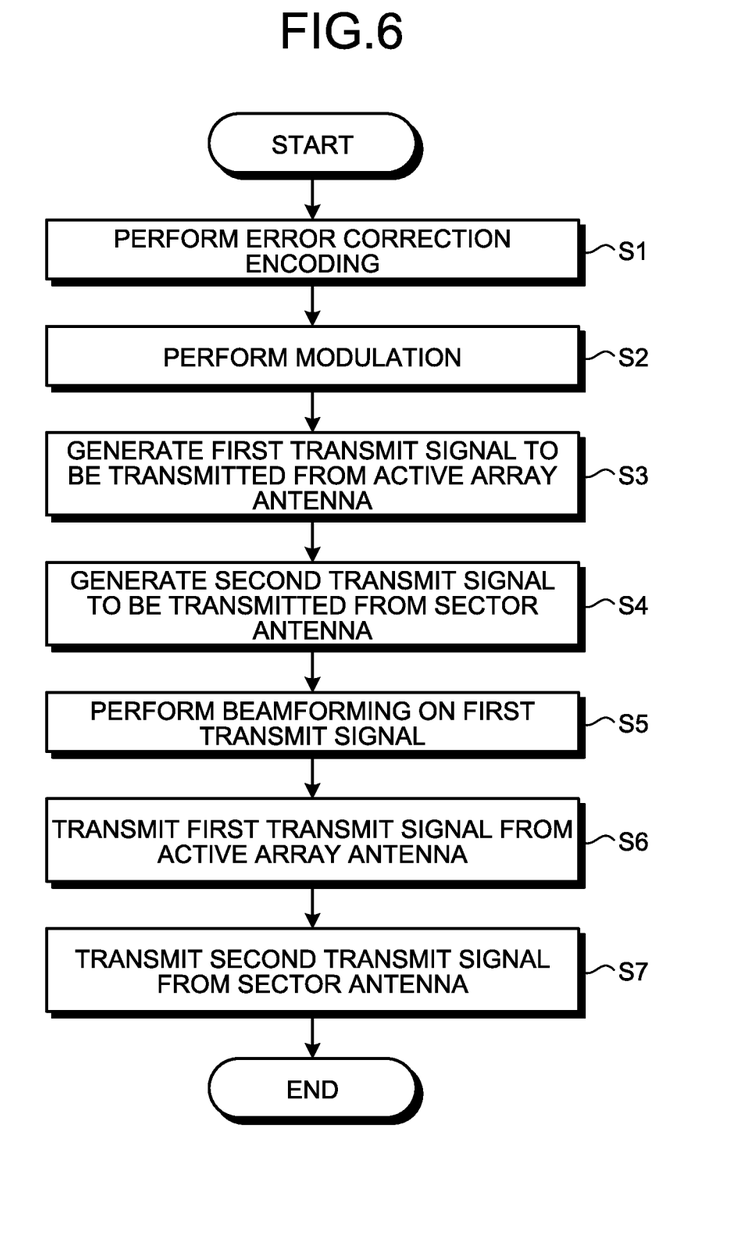
FIG. 6 is a flowchart illustrating processing in which the base station apparatus according to the first embodiment transmits transmit data for each user.

Processing in a wireless communication method of transmitting the base station apparatus 3 from the transmit data for each user to the terminal 5 will be described with reference to a flowchart. FIG. 6 is a flowchart illustrating the processing in which the base station apparatus 3 according to the first embodiment transmits the transmit data for each user.

First, the error correction encoder 141 of the base station apparatus 3 performs error correction encoding on the transmit data for each user, the transmit data being acquired from the wired data transceiver 15 (step S1).

The modulator 142 performs modulation, specifically the primary modulation and secondary modulation as described above, on the transmit data that has been subjected to the error correction encoding (step S2).

The precoding unit 143 generates, from the modulated transmit data, a first transmit signal that is to be transmitted from the active array antenna 1, the first transmit signal being a transmit signal indicative of the transmit data for each user, such that the precoding unit 143 outputs the generated first transmit signal to the transmit beamforming unit 144 (step S3). The precoding unit 143 also generates, from the modulated transmit data, a second transmit signal that is to be transmitted from the sector antenna 2, the second transmit signal eliminating interference between the terminals 5, the interference being generated by the transmit signal transmitted from the active array antenna 1 (step S4). The precoding unit 143 outputs the generated second transmit signal to the sector antenna 2. Step S3 is a first generation step, and step S4 is a second generation step. Note that when transmitting the common control data together with the transmit signal, the precoding unit 143 adds the second transmit signal to the common control data subjected to transmit diversity coding, and outputs the result of the addition, to the sector antenna 2.

The transmit beamforming unit 144 performs beamforming by multiplying the first transmit signal by a complex weighting factor for each antenna element 10 of the active array antenna 1, and adding the signals to each other on the terminal-by-terminal basis (step S5).

The active array antenna 1 then transmits the first transmit signal, which has been subjected to the beamforming by the transmit beamforming unit 144, to the terminal 5 (step S6). The sector antenna 2 transmits the second transmit signal to the terminal 5 (step S7). Step S6 is a first transmission step, and step S7 is a second transmission step.

Next, the hardware configuration of the base station apparatus 3 will be described. In the base station apparatus 3, the active array antenna 1 and the sector antenna 2 may each be an existing antenna similar to that used in a related art. As for the radio frequency section 11, as described above, the frequency converters 110 and 114 are each implemented by the frequency mixer, the local oscillator, and the filter. The transmission signal amplifier 111 and the reception signal amplifier 113 are each implemented by the semiconductor amplifier. The transmit-receive duplexer 112 is implemented by the semiconductor switch or frequency duplexer. The A/D converter 12 is implemented by an analog-to-digital conversion circuit. The D/A converter 13 is implemented by a digital-to-analog conversion circuit. The wired data transceiver 15 is implemented by an interface circuit that transmits and receives data to and from the wired network 4. The digital signal processor 14 is implemented by a processing circuit. That is, the base station apparatus 3 includes the processing circuit for generating the first transmit signal which is to be transmitted from the active array antenna 1 and the second transmit signal which is to be transmitted from the sector antenna 2, the second transmit signal eliminating interference between the terminals 5 generated by the first transmit signal. The processing circuit may be dedicated hardware, or a memory and a central processing unit (CPU) executing a program stored in the memory.

Figure 7:
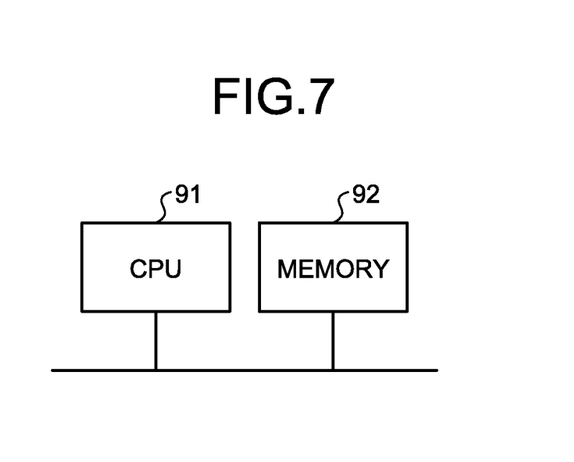
FIG. 7 is a diagram illustrating an example when the digital signal processor according to the first embodiment is made up of a CPU and a memory.

FIG. 7 is a diagram illustrating an example when the digital signal processor 14 according to the first embodiment is made up of a CPU and a memory. When the processing circuit is made up of a CPU 91 and a memory 92, each function of the digital signal processor 14 is implemented by software, firmware, or a combination of software and firmware. The software or firmware is described as a program and stored in the memory 92. The processing circuit implements each function by the CPU 91 reading and executing the program stored in the memory 92. That is, when the digital signal processor 14 is implemented by the processing circuit, the base station apparatus 3 includes the memory 92 for storing programs, which, when executed, perform the step of generating the first transmit signal that is to be transmitted from the active array antenna 1 and the step of generating the second transmit signal that is to be transmitted from the sector antenna 2. In other words, these programs cause a computer to execute the procedure and method related to the base station apparatus 3. Here, the CPU 91 may be a processing unit, an arithmetic unit, a microprocessor, a microcomputer, a processor, or a digital signal processor (DSP). The memory 92 corresponds to a non-volatile or volatile semiconductor memory such as a random access memory (RAM), a read only memory (ROM), a flash memory, an erasable programmable ROM (EPROM), or an electrically EPROM (EEPROM), a magnetic disk, a flexible disk, an optical disk, a compact disc, a mini disc, or a digital versatile disc (DVD).

Figure 8:
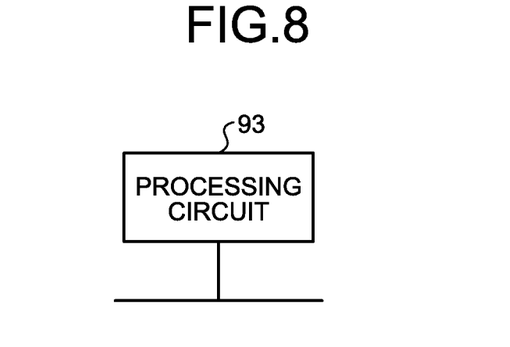
FIG. 8 is a diagram illustrating an example when the digital signal processor according to the first embodiment is made up of dedicated hardware.

FIG. 8 is a diagram illustrating an example when the digital signal processor 14 according to the first embodiment is made up of dedicated hardware. When the processing circuit is the dedicated hardware, a processing circuit 93 illustrated in FIG. 8 corresponds to a single circuit, a complex circuit, a programmed processor, a parallel-programmed processor, an application specific integrated circuit (ASIC), a field programmable gate array (FPGA), or a combination of those, for example. The functions of the digital signal processor 14 may each be implemented separately by the processing circuit 93, or may be implemented collectively by the processing circuit 93.

Note that the functions of the digital signal processor 14 may be implemented partly by dedicated hardware and partly by software or firmware. The processing circuit can thus implement the aforementioned functions by dedicated hardware, software, firmware, or a combination of these.

As described above, according to the present embodiment, the base station apparatus 3 includes the active array antenna 1 and the sector antenna 2, and the digital signal processor 14 performs precoding on the transmit data that is to be transmitted to the terminal 5; thus, the digital signal processor 14 generates the first transmit signal that is to be transmitted from the active array antenna 1. The digital signal processor 14 generates the second transmit signal that is to be transmitted from the sector antenna 2, the second transmit signal eliminating interference between the terminals 5, the interference being generated by the first transmit signal. Then, the first transmit signal is transmitted from the active array antenna 1, and the second transmit signal is transmitted from the sector antenna 2. The base station apparatus 3 uses the sector antenna 2 having a wide beam width in addition to the active array antenna 1, thereby enabling elimination of the interference between the terminals 5 due to the side lobes 7 or multipath at the time of signal transmission. As a result, the transmission rate in multi-user MIMO can increase. In particular, the base station apparatus 3 sets the interval between the sector antennas 2 sufficiently wider than the interval between the antenna elements 10 of the active array antenna 1, thereby providing a wider aperture and thus higher angular resolution than when using only the active array antenna 1, and improving the separation performance of the users, or the terminals 5.

The base station apparatus 3 attempting to improve the angular resolution using only the active array antenna 1 results in a significant increase in the number of antenna elements and a significant increase in cost. On the other hand, the base station apparatus 3 can achieve a significant reduction in cost by using the active array antenna 1 and the sector antenna 2 together as in the present embodiment. Moreover, as for the sector antenna 2, the base station apparatus 3 need not calculate the weight for each antenna element 10 that is required for the active array antenna 1. As a result, it becomes possible to significantly reduce the calculation required for beamforming and reduce power consumption of the digital parts.

Furthermore, as for a broadcast channel, a random access channel, and the like, the base station apparatus 3 transmits and receives signals from the sector antenna 2 having the wide beam width, thereby eliminating the need for beam scanning and thus shortening the time taken before the start of communication, as compared with the use of the active array antenna 1 only.

Second Embodiment

In a second embodiment, a base station apparatus includes a plurality of active array antennas 1. The second embodiment differs from the first embodiment in the respects as described below.

Figure 9:
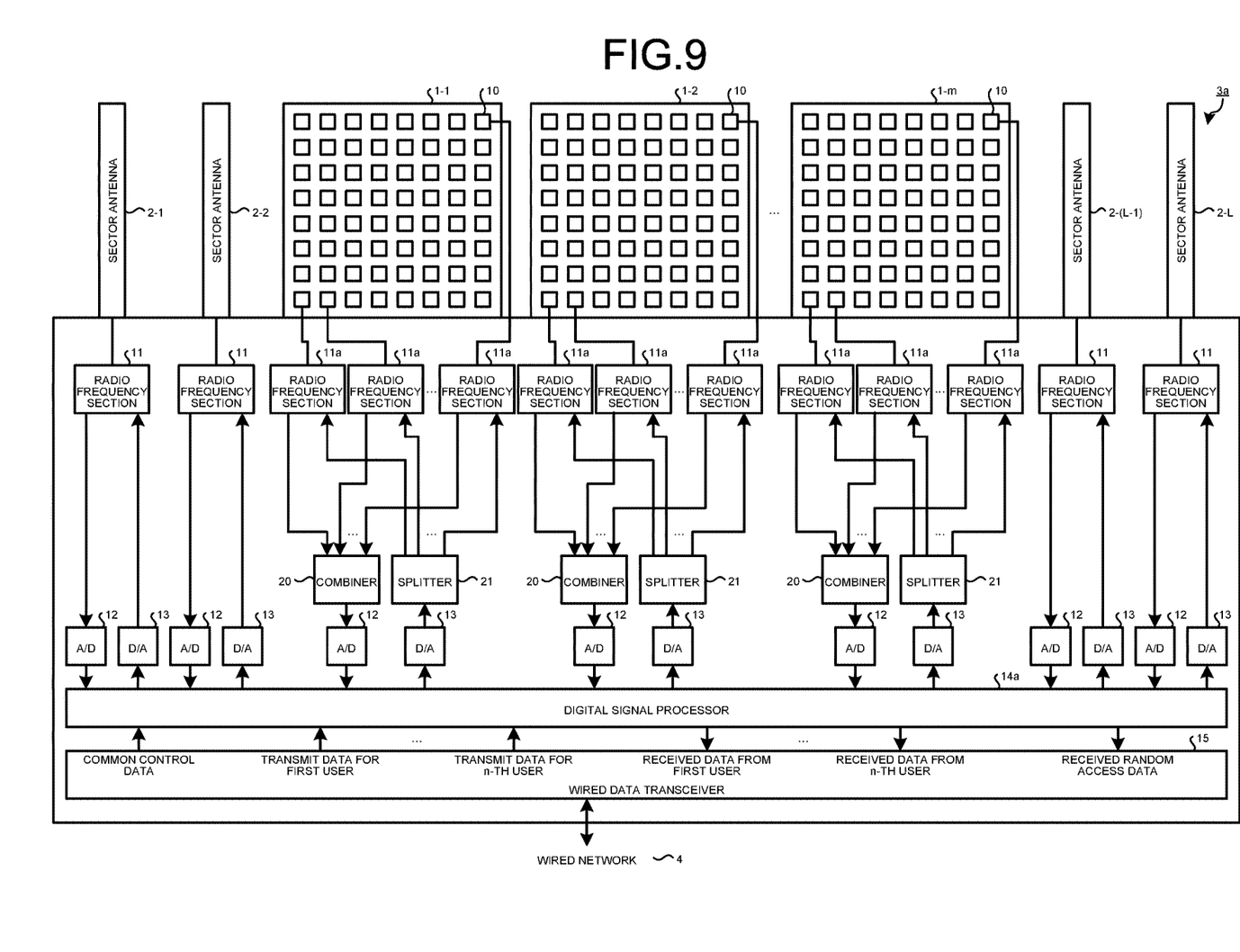
FIG. 9 is a block diagram illustrating an example of the configuration of a base station apparatus according to a second embodiment.

FIG. 9 is a block diagram illustrating an example of the configuration of a base station apparatus 3a according to the second embodiment. The base station apparatus 3a includes active array antennas 1-1 to 1-m, the sector antennas 2-1 to 2-L, the plurality of radio frequency sections 11, a plurality of radio frequency sections 11a, the plurality of A/D converters 12, the plurality of D/A converters 13, a digital signal processor 14a, the wired data transceiver 15, a plurality of combiners 20, and a plurality of splitters 21. In the following description, the active array antennas 1-1 to 1-m may be referred to as the active array antenna 1 when the antennas are not distinguished from one another. The active array antennas 1-1 to 1-m each have the configuration similar to the configuration of the active array antenna 1 in the first embodiment.

The base station apparatus 3a includes the radio frequency section 11 for each sector antenna 2. The base station apparatus 3a also includes the radio frequency section 11a for each antenna element 10 of the active array antennas 1-1 to 1-m. Moreover, the base station apparatus 3a includes the A/D converter 12 and the D/A converter 13 for each active array antenna 1 and each sector antenna 2. The base station apparatus 3a also includes the combiner 20 and the splitter 21 for each active array antenna 1.

In the first embodiment, the base station apparatus 3 requires the A/D converter 12 and the D/A converter 13 for each antenna element 10 of one active array antenna 1. In the second embodiment, on the other hand, the base station apparatus 3a uses "m" active array antennas 1, each of which transmits and receives only one beam 6. The base station apparatus 3a thus includes the A/D converter 12 and the D/A converter 13 for each active array antenna 1, that is, includes fewer numbers of the A/D converters 12 and the D/A converters 13, thereby reducing cost as compared to the base station apparatus 3 of the first embodiment.

The combiner 20 combines a plurality of analog baseband signals output from the radio frequency sections 11a each connected to the corresponding antenna element 10 of the active array antenna 1, and outputs the combined signal to the A/D converter 12.

The splitter 21 splits an analog baseband signal output from the D/A converter 13 into a plurality of analog baseband signals, and outputs these signals to the corresponding radio frequency sections 11a.

For the base station apparatus 3 in the first embodiment, each of the transmit beamforming unit 144 and the receive beamforming unit 145 multiplies the signal by the weighting factor for each antenna element 10 of the active array antenna 1. For the base station apparatus 3a in the second embodiment, the radio frequency sections 11a multiply signals by weighting factors for respective antenna elements 10 of the active array antenna 1.

Figure 10:
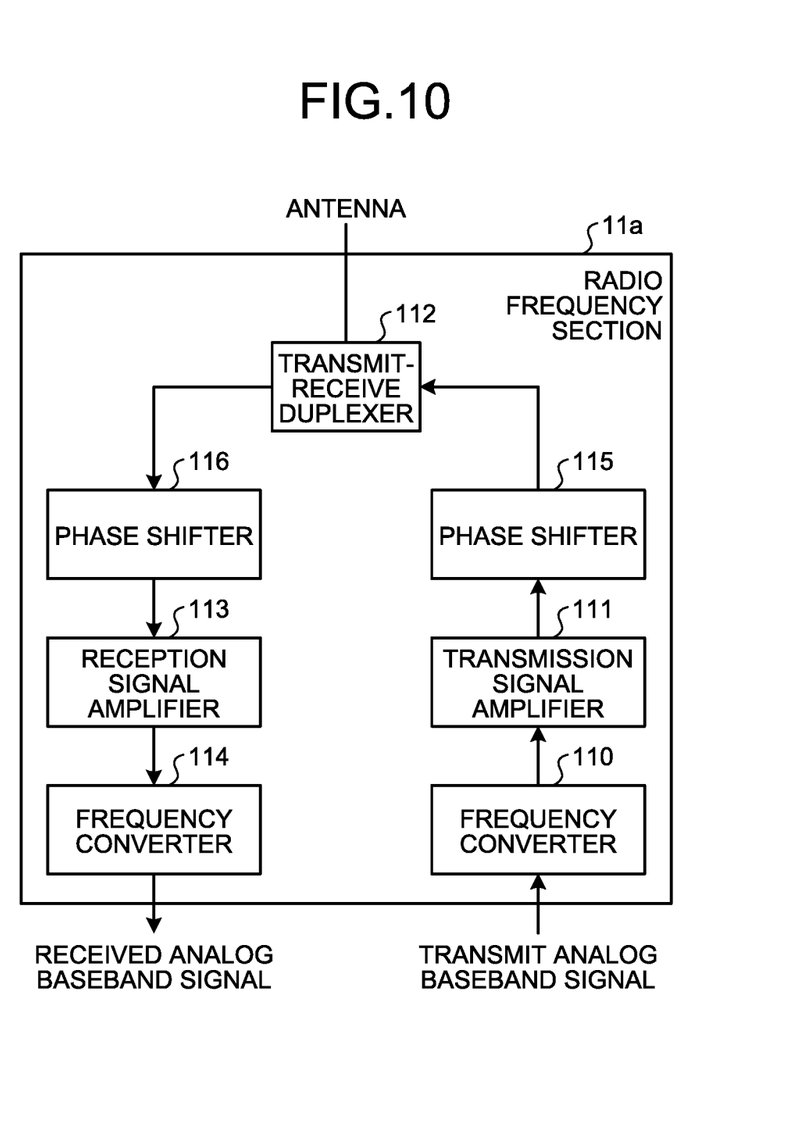
FIG. 10 is a block diagram illustrating an example of the configuration of a radio frequency section of the base station apparatus according to the second embodiment.

FIG. 10 is a block diagram illustrating an example of the configuration of the radio frequency section 11a of the base station apparatus 3a according to the second embodiment. The radio frequency section 11a is obtained by adding phase shifters 115 and 116 to the configuration of the radio frequency section 11. In the second embodiment, the phase shifter 115 of the radio frequency section 11a multiplies a transmit signal by a weighting factor for one antenna element 10, although the transmit beamforming unit 144 in the first embodiment that multiplies the transmit signal by a weighting factor for each of the antenna elements 10 of the active array antenna 1. Moreover, in the second embodiment, the phase shifter 116 of the radio frequency section 11a multiplies a receive signal by a weighting factor for one antenna element 10, although the receive beamforming unit 145 in the first embodiment that multiplies the received signal by a weighting factor for each of the antenna elements 10 of the active array antenna 1.

Figure 11:
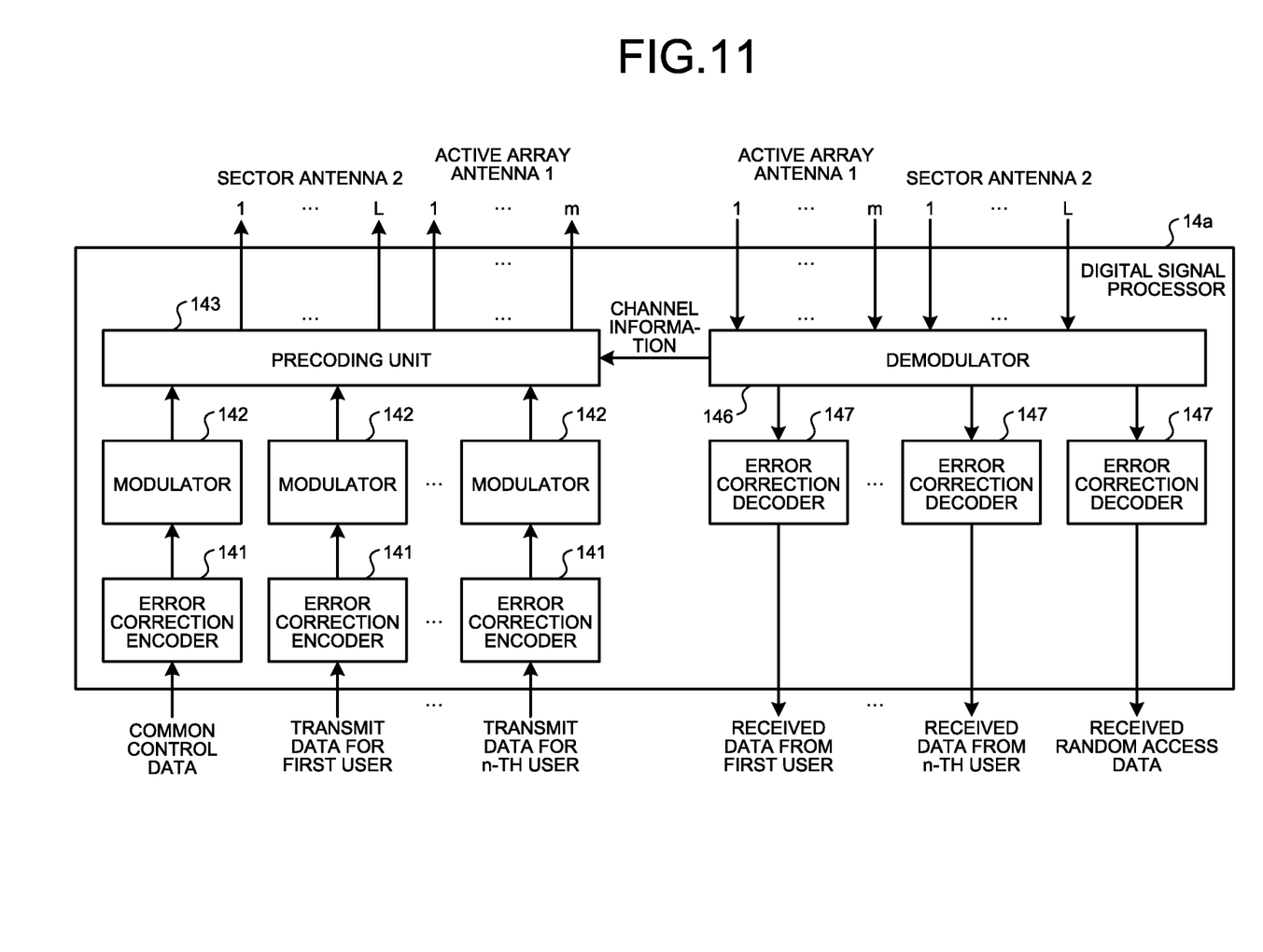
FIG. 11 is a block diagram illustrating an example of the configuration of a digital signal processor of the base station apparatus according to the second embodiment.

FIG. 11 is a block diagram illustrating an example of the configuration of the digital signal processor 14a of the base station apparatus 3a according to the second embodiment. The digital signal processor 14a is obtained by removing the transmit beamforming unit 144 and the receive beamforming unit 145 from the digital signal processor 14 of the first embodiment. As described above, the processing performed by the transmit beamforming unit 144 and the receive beamforming unit 145 in the first embodiment is performed by the phase shifters 115 and 116 of the radio frequency section 11a in the second embodiment. The second embodiment thus does not require the transmit beamforming unit 144 and the receive beamforming unit 145 in the digital signal processor 14a.

In the second embodiment, the base station apparatus 3a performs beamforming by adjusting the phase of each antenna element 10 using the analog phase shifters 115 and 116, and thus can only transmit one beam 6 from one active array antenna 1. The base station apparatus 3a therefore uses "m" active array antennas 1 to make "m" beams 6.

In the base station apparatus 3a, the configuration and operation of the precoding unit 143 and the other components are similar to the configuration and operation of the first embodiment.

As described above, according to the present embodiment, the base station apparatus 3a including the plurality of active array antennas 1 includes, for each active array antenna 1, the A/D converter 12 and the D/A converter 13 that are connected to the active array antenna 1. Such a configuration can reduce cost as compared to the first embodiment that includes the A/D converter 12 and the D/A converter 13 for each antenna element 10 in the active array antenna 1.

The configuration illustrated in the above embodiment merely illustrates an example of the content of the present invention, and can thus be combined with another known technique or partially omitted and/or modified without departing from the scope of the present invention.

REFERENCE SIGNS LIST 1, 1-1 to 1-m active array antenna; 2-1 to 2-L sector antenna; 3, 3a base station apparatus; 4 wired network; 5-1, 5-2 terminal; 6-1, 6-2 beam; 7-1 to 7-4 side lobe; 9 wireless communication system; 11, 11a radio frequency section; 12 A/D converter; 13 D/A converter; 14, 14a digital signal processor; 15 wired data transceiver; combiner; 21 splitter; 110, 114 frequency converter; 111 transmission signal amplifier; 112 transmit-receive duplexer; 113 reception signal amplifier; 115, 116 phase shifter; 141 error correction encoder; 142 modulator; 143 precoding unit; 144 transmit beamforming unit; 145 receive beamforming unit; 146 demodulator; 147 error correction decoder; 1430 transmit diversity part; 1431 adder; 1432 precoding weight calculating part; 1433 precoding weight multiplying part.

The invention claimed is:

1. A wireless base station apparatus that communicates with a plurality of terminals via spatial multiplexing, the apparatus comprising:
a two-dimensional array antenna to transmit a first transmit signal;
a sector antenna to transmit a second transmit signal; and
a digital signal processor to generate the first transmit signal that is transmitted from the two-dimensional array antenna, and generate the second transmit signal that is transmitted from the sector antenna, the second transmit signal being a transmit signal for eliminating interference between the terminals generated by the first transmit signal, wherein
the digital signal processor generates the first transmit signal by performing precoding on a signal that is to be transmitted for each of the terminals, and
the digital signal processor generates the second transmit signal by using:
a signal obtained by performing the precoding on the signal that is to be transmitted for each of the terminals; and
a control signal that is common to the plurality of terminals.

2. The wireless base station apparatus according to claim 1, wherein
the digital signal processor uses the sector antenna for transmitting the control signal common to the plurality of terminals and receiving random access signals from the plurality of terminals, and uses the two-dimensional array antenna and the sector antenna for transmitting and receiving a signal to/from each of the terminals.

3. The wireless base station apparatus according to claim 1, wherein
the sector antenna is plural in number, and
for each of a plurality of antenna elements of the two-dimensional array antenna and each of the sector antennas, the wireless base station apparatus further includes:
an analog-to-digital converter to convert a signal received from any of the terminals, from an analog signal into a digital signal; and
a digital-to-analog converter to convert a signal that is to be transmitted to any of the terminals, from a digital signal into an analog signal.

4. The wireless base station apparatus according to claim 1, wherein
the sector antenna is plural in number and the two-dimensional array antennas is plural in number, and
for each of the sector antennas and each of the two-dimensional array antennas, the wireless base station apparatus further includes:
an analog-to-digital converter to convert a signal received from any of the terminals, from an analog signal into a digital signal; and
a digital-to-analog converter to convert a signal that is to be transmitted to any of the terminals, from a digital signal into an analog signal.

5. A wireless communication method in a wireless base station apparatus to communicate with a plurality of terminals via spatial multiplexing, the method comprising:
generating a first transmit signal that is transmitted from a two-dimensional array antenna;
generating a second transmit signal that is a transmit signal for eliminating interference between the terminals generated by the first transmit signal, the second transmit signal being transmitted from a sector antenna;
transmitting the first transmit signal; and
transmitting the second transmit signal, wherein
generating the first transmit signal includes generating the first transmit signal by performing precoding on a signal that is to be transmitted for each of the terminals, and
generating the second transmit signal includes generating the second transmit signal by using:
a signal obtained by performing the precoding on the signal that is to be transmitted for each of the terminals; and
a control signal that is common to the plurality of terminals.

6. The wireless base station apparatus according to claim 2, wherein
the sector antenna is plural in number, and
for each of a plurality of antenna elements of the two-dimensional array antenna and each of the sector antennas, the wireless base station apparatus further includes:
an analog-to-digital converter to convert a signal received from any of the terminals, from an analog signal into a digital signal; and
a digital-to-analog converter to convert a signal that is to be transmitted to any of the terminals, from a digital signal into an analog signal.

7. The wireless base station apparatus according to claim 2, wherein
the sector antenna is plural in number and the two-dimensional array antennas is plural in number, and
for each of the sector antennas and each of the two-dimensional array antennas, the wireless base station apparatus further includes:
an analog-to-digital converter to convert a signal received from any of the terminals, from an analog signal into a digital signal; and
a digital-to-analog converter to convert a signal that is to be transmitted to any of the terminals, from a digital signal into an analog signal.

8. A non-transitory storage medium of a wireless base station apparatus that communicates with a plurality of terminals via spatial multiplexing, the apparatus comprising a two-dimensional array antenna to transmit a first transmit signal, and a sector antenna to transmit a second transmit signal, the storage medium storing a program which when executed by a processor performs processes of:
generating the first transmit signal that is transmitted from the two-dimensional array antenna; and
generating the second transmit signal that is transmitted from the sector antenna, the second transmit signal being a transmit signal for eliminating interference between the terminals generated by the first transmit signal, wherein
the program executed by the processor performs a process of generating the first transmit signal by performing precoding on a signal that is to be transmitted for each of the terminals, and
the program executed by the processor performs a process of generating the second transmit signal by using:
a signal obtained by performing the precoding on the signal that is to be transmitted for each of the terminals; and
a control signal that is common to the plurality of terminals.

9. A control circuit of a wireless base station apparatus that communicates with a plurality of terminals via spatial multiplexing, the apparatus comprising a two-dimensional array antenna to transmit a first transmit signal, and a sector antenna to transmit a second transmit signal,
- the control circuit generating the first transmit signal that is transmitted from the two-dimensional array antenna,
- the control circuit generating the second transmit signal that is transmitted from the sector antenna, the second transmit signal being a transmit signal for eliminating interference between the terminals generated by the first transmit signal, wherein
- the control circuit generates the first transmit signal by performing precoding on a signal that is to be transmitted for each of the terminals, and
- the control circuit generates the second transmit signal by using:
  - a signal obtained by performing the precoding on the signal that is to be transmitted for each of the terminals; and
  - a control signal that is common to the plurality of terminals.

* * * * *